United States Patent
Park et al.

(10) Patent No.: US 7,141,999 B2
(45) Date of Patent: Nov. 28, 2006

(54) SEMICONDUCTOR PROBE WITH RESISTIVE TIP AND METHOD OF FABRICATING THE SAME, AND INFORMATION RECORDING APPARATUS, INFORMATION REPRODUCING APPARATUS, AND INFORMATION MEASURING APPARATUS HAVING THE SEMICONDUCTOR PROBE

(75) Inventors: Hong-Sik Park, Seoul (KR); Hyun-Jung Shin, Seongnam-si (KR); Ju-Hwan Jung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 10/512,967

(22) PCT Filed: May 1, 2003

(86) PCT No.: PCT/KR03/00878

§ 371 (c)(1),
(2), (4) Date: Oct. 29, 2004

(87) PCT Pub. No.: WO03/096409

PCT Pub. Date: Nov. 20, 2003

(65) Prior Publication Data

US 2005/0231225 A1 Oct. 20, 2005

(30) Foreign Application Priority Data

May 8, 2002 (KR) .................. 10-2002-0025400

(51) Int. Cl.
*G01R 31/02* (2006.01)

(52) U.S. Cl. ............................. 324/762; 324/754
(58) Field of Classification Search ................... None
See application file for complete search history.

(56) References Cited

U.S. PATENT DOCUMENTS 5,347,226 A 9/1994 Bachmann
5,475,318 A * 12/1995 Marcus et al. ............. 324/762

(Continued)

FOREIGN PATENT DOCUMENTS

| JP | 07-296341 A | 11/1995 |
| JP | 08-015283 A | 1/1996 |
| JP | 09-203738 A | 8/1997 |

(Continued)

*Primary Examiner*—Vinh Nguyen
*Assistant Examiner*—Richard Isla-Rodas
(74) *Attorney, Agent, or Firm*—Sughrue Mion, PLLC

(57) ABSTRACT

Provided are a semiconductor probe having a resistive tip, a method of fabricating the semiconductor probe, and a method of recording and reproducing information using the semiconductor probe. The semiconductor probe includes a tip and a cantilever. The tip is doped with first impurities. The cantilever has an end portion on which the tip is positioned. The tip includes a resistive area, and first and second semiconductor electrode areas. The resistive area is positioned at the peak of the tip and lightly doped with second impurities that are different from the first impurities. The first and second semiconductor electrode areas are heavily doped with the second impurities and contact the resistive area.

8 Claims, 14 Drawing Sheets

U.S. PATENT DOCUMENTS

| | | |
|---|---|---|
| 5,710,052 A | 1/1998 | Alvis |
| 5,838,005 A * | 11/1998 | Majumdar et al. .......... 250/306 |
| 6,000,947 A | 12/1999 | Minne |
| 6,400,166 B1 * | 6/2002 | Babson et al. .............. 324/754 |
| 6,521,921 B1 * | 2/2003 | Lim et al. ................... 257/255 |
| 6,703,258 B1 * | 3/2004 | Hopson et al. .............. 438/52 |
| 6,851,301 B1 * | 2/2005 | Kim et al. ................... 73/105 |

FOREIGN PATENT DOCUMENTS

| | | |
|---|---|---|
| JP | 10-246730 A | 9/1998 |
| JP | 11-128126 A | 5/1999 |
| JP | 11-297773 A | 10/1999 |
| JP | 11-352136 A | 12/1999 |

* cited by examiner

SEMICONDUCTOR PROBE WITH RESISTIVE TIP AND METHOD OF FABRICATING THE SAME, AND INFORMATION RECORDING APPARATUS, INFORMATION REPRODUCING APPARATUS, AND INFORMATION MEASURING APPARATUS HAVING THE SEMICONDUCTOR PROBE

BACKGROUND OF THE INVENTION

This application claims the benefit of Korean Patent Application No. 2002-25400, filed on May 8, 2002, in the Korean Intellectual Property Office, the disclosure of which is incorporated herein in its entirety by reference.

1. Field of the Invention

The present invention relates to a high-speed, sensitive semiconductor probe with a resistive tip and a method of fabricating the same, and to an information recording apparatus, an information reproducing apparatus, and an information measuring apparatus having the semiconductor probe.

2. Description of the Related Art

As the demand for small-sized products such as portable communication terminals and electronic notes increases, highly-integrated micro nonvolatile recording media are increasingly required. It is not easy to reduce the size of existing hard disks and to highly integrate flash memories. Thus, information storage media and method using a scanning probe have been studied as a possible alternative.

The scanning probe is used in various types of scanning probe microscopes (SPMs). For example, the scanning probe is used in a scanning tunneling microscope (STM), an atomic force microscope (AFM), a magnetic force microscope (MFM), a scanning near-field optical microscope (SNOM), an electrostatic force microscope (EFM), and the like. The STM detects a current flowing through a probe based on a difference between voltages applied to the probe and a sample to reproduce information. The AFM uses an atomic force between a probe and a sample. The MFM uses a magnetic force between a magnetic field near the surface of a sample and a magnetized probe. The SNOM improves a resolution less than the wavelength of visible light. The EFM uses an electrostatic force between a sample and a probe.

In order to record and reproduce information at a high speed and density using such a SPM, a surface charge in a small area having a diameter of several tens of nanometers should be detected. Also, a cantilever should be made into an array form to increase a recording and reproduction speed.

FIG. 1A is a perspective view of a metal-on-semiconductor field effect transistor (MOSFET) probe of a scanning probe microscope, the MOSFET probe having a MOSFET channel structure, disclosed in Korea Patent Publication No. 2001-45981, and FIG. 1B is an enlarged view of portion A of FIG. 1A.

Referring to FIG. 1A, a MOSFET probe 22, which is formed by etching a semiconductor substrate 20, has a bar-shaped protrusion that protrudes from the semiconductor substrate 20. Electrode pads 20a and 20b face each other on a portion of the semiconductor substrate 20 contacting one end of the MOSFET probe 22.

Referring to FIG. 1B, a source area 11 and a drain area 13 are formed on the slope of a V-shaped tip 10 of the MOSFET probe 22, and a channel area 12 is formed therebetween.

The V-shaped tip of the MOSFET probe 10 having the above-described structure is positioned on the end portion of a cantilever. Thus, it is not easy to make probes having a radius of several tens of nanometers into an array form. In the prior art, in order to manufacture such a probe, a tip having a radius of several tens of nanometers should be manufactured using the various processes including an oxidization process and so forth so that the probe is perpendicular to a cantilever. However, since the precision of a photolithographic process decreases considerably when a tip is formed to a height of several tens of nanometers, it is difficult to form a source area and a drain area so as to make a short channel.

FIGS. 2A and 2B are schematic cross-sectional views for explaining a method of reproducing information using a MOSFET tip in which source and drain areas 11 and 13 are formed. Referring to FIG. 2A, a MOSFET tip 10, which is V-shaped, is doped with p-type impurities. Next, the MOSFET tip 10 is doped with n-type impurities to form source and drain areas 11 and 13 on the slope thereof. The MOSFET tip 10 detects a current flowing through a channel 12 based on the polarity of a surface charge 17 while it moves over the surface of a recording medium 15, in order to detect the polarity and density of the surface charge 17.

FIG. 2B is an enlarged cross-sectional view of the peak of the MOSFET tip 10 for explaining a process of expanding a depletion area 14. Referring to FIG. 2B, when the MOSFET tip 10 is positioned over a positive surface charge 17 in the recording medium 15, holes of the channel 12 doped with p-type impurities move toward the source and drain areas 11 and 13 little by little due to electric fields induced by the positive surface charge 17.

The depletion area 14, from which the holes are depleted due to the movement of the holes, expands. When an electric field greater than an electric field maximizing the size of the depletion area 14 is applied to the peak of the MOSFET tip 10, a channel containing minority carriers is formed at the peak of the MOSFET tip 10. If a greater electric field is applied to the peak of the MOSFET tip 10, a channel containing electrons is connected to the source and drain areas 11 and 13. Then, a current flows through the channel due to a voltage applied between the source and drain areas 11 and 13.

In other words, the MOSFET tip 10 operates as a transistor only if an electric field induced by a surface charge has a value higher than a threshold electric field value that is suitable for expanding a channel containing minority carriers up to source and drain areas. Thus, since a surface charge inducing an electric field that is less than the threshold electric field value cannot be detected, the MOSFET tip 10 operates within a limited range and the sensitivity of the MOSFET probe 10 degrades.

SUMMARY OF THE INVENTION

The present invention provides a semiconductor probe with a resistive tip that is sensitive to an electric field and a method of manufacturing the same using a self-alignment method.

The present invention also provides an information recording, reproducing, and measuring apparatus for recording, reproducing, and measuring information on a recording medium by detecting an electric field having a strength less than that of a minimum electric field that can be detected by using a MOSFET probe, and an information recording, reproducing, and measuring method therefor.

According to an aspect of the present invention, there is provided a semiconductor probe including a tip and a cantilever. The tip is doped with first impurities. The cantilever has an end portion on which the tip is positioned. The tip includes a resistive area and first and second semiconductor electrode areas. The resistive area is positioned at the peak of the tip and lightly doped with second impurities that are different from the first impurities. The first and second semiconductor electrode areas are heavily doped with the second impurities and contact the resistive area.

According to another aspect of the present invention, there is provided a method of fabricating a semiconductor probe. A resistive area is formed on a substrate by lightly doping the surface of the substrate, which has been doped with first impurities, with second impurities that are different from the first impurities. A mask layer having a predetermined shape is formed on the resistive area and areas of the substrate except the mask layer are heavily doped with the second impurities to form first and second semiconductor electrode areas. A photoresist having a predetermined shape is coated on the mask layer so as to be perpendicular to the mask layer and an etching process is formed to make the mask layer into a predetermined shape. The substrate is etched and a thermal oxidation process is performed to complete the semiconductor tip.

It is preferable that the mask layer formed on the resistive area has a strip shape.

According to still another aspect of the present invention, there is provided an information recording apparatus for recording information on a recording medium. The information recording apparatus includes an electrode layer, a ferroelectric layer stacked on the electrode layer, and a semiconductor probe. The semiconductor probe includes a tip and a cantilever, an end portion of which the tip is positioned on. The tip doped with first impurities has a resistive area doped with second impurities and formed at the peak of the tip, and first and second semiconductor electrode areas doped with the second impurities and contacting the resistive area, where the second impurities are different from the first impurities. When a voltage is applied to the first and second semiconductor electrode areas, electric fields are formed between the electrode layer of the recording medium and the tip, a dielectric polarization is formed in the ferroelectric layer, and the semiconductor probe records information on the recording medium.

According to yet another aspect of the present invention, there is provided an information reproducing apparatus for reproducing information recorded on a recording medium. The information reproducing apparatus includes a ferroelectric layer and a semiconductor probe having a tip and a cantilever, an end portion of which the tip is positioned on. The tip doped with first impurities has a resistive area that is doped with second impurities and formed at the peak of the tip, and first and second semiconductor electrode areas doped with the second impurities and contacting the resistive area, where the second impurities are different from the first impurities. The semiconductor probe reproduces information recorded on the recording medium by detecting a variation in the resistance of the resistive area due to electric fields induced by the recording medium.

According to yet another aspect of the present invention, there is provided an information measuring apparatus for imaging charges contained in a sample including information emitting electric fields. The information measuring apparatus includes a semiconductor probe having a tip and a cantilever, an end portion of which the tip is positioned on. The tip doped with first impurities has a resistive area that is doped with second impurities and formed at the peak of the tip, and first and second semiconductor electrode areas doped with the second impurities and contacting the resistive area, where the second impurities are different from the first impurities. The semiconductor probe measures the information by detecting a variation in the resistance of the resistive area due to the electric fields induced by the sample.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a semiconductor probe and a method of fabricating the same according to an embodiment of the present invention will be described in detail with reference to the attached drawings.

Figure 3:
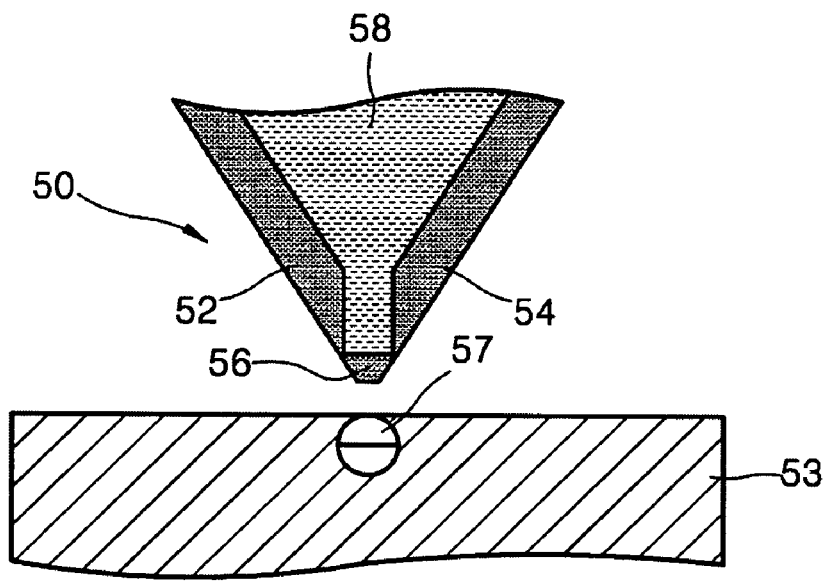
FIG. 3 is a schematic cross-sectional view illustrating a semiconductor probe according to an embodiment of the present invention.

FIG. 3 is a schematic cross-sectional view illustrating a resistive tip of a semiconductor probe according to an embodiment of the present invention. Referring to FIG. 3, a resistive tip 50 includes a body 58 doped with first impurities, a resistive area 56, which is positioned at the peak of a resistive tip of the semiconductor probe 50 and lightly doped with second impurities, and first and second semiconductor electrode areas 52 and 54, which are formed on the slope around the resistive area 56 of the resistive tip 50 and are highly doped with the second impurities. Here, if the first impurities are p-type impurities, the second impurities are n-type impurities. If the first impurities are n-type impurities, the second impurities are p-type impurities.

In the semiconductor probe according to the embodiment of the present invention, a difference in a surface charge 57 in a recording medium 53 causes electric fields of different strengths to be induced, due to which a resistance of the resistive area 56 varies. The polarity and density of the surface charge 57 can be detected from the variation in the resistance.

Figure 4:
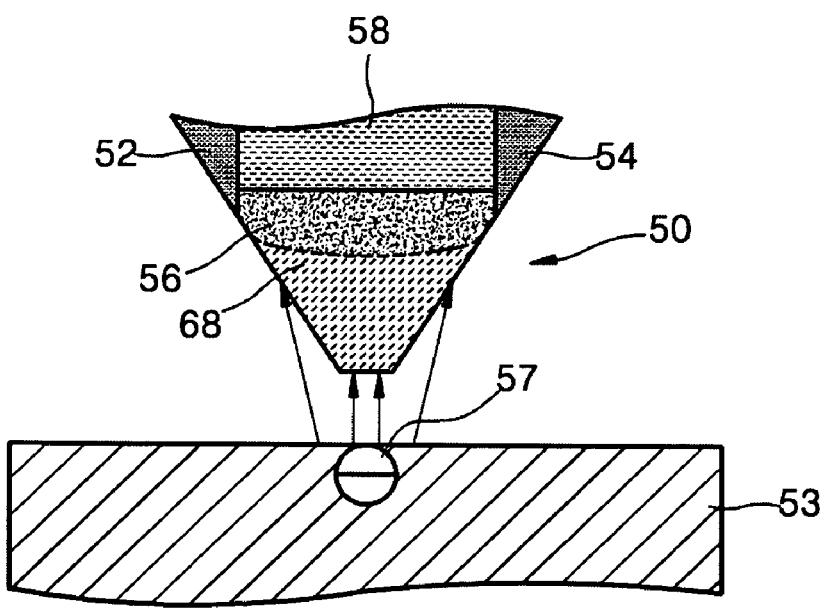
FIG. 4 is a schematic cross-sectional view for explaining a principle of expanding a depletion area in the semiconductor probe according to the present invention.

FIG. 4 is a schematic cross-sectional view for explaining a principle of expanding a depletion area in a resistive tip according to the present invention.

Figure 1A:
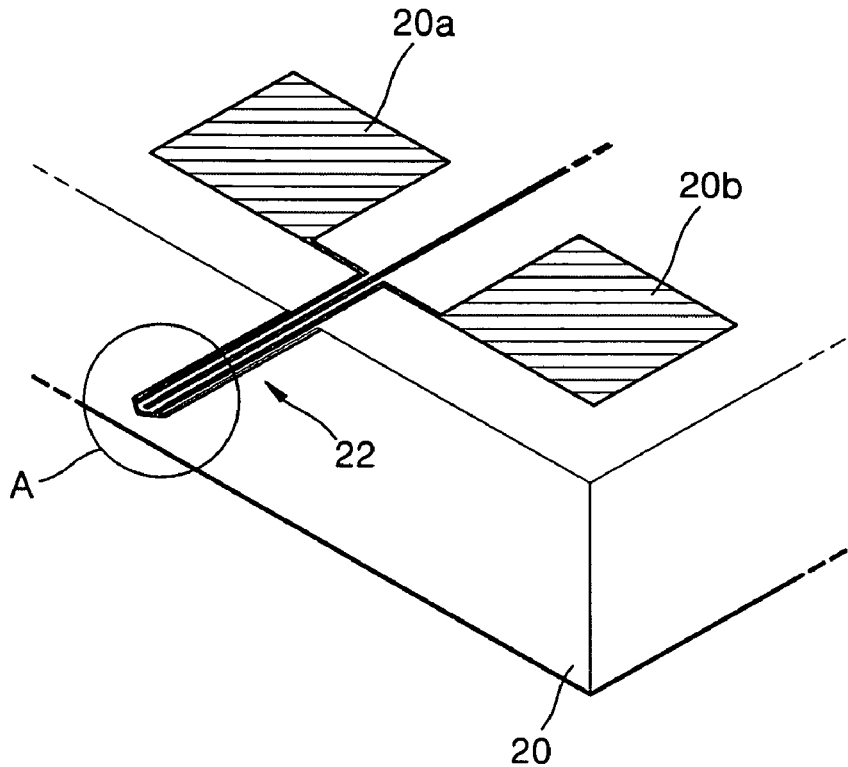
FIG. 1A is a perspective view of a probe of a scanning probe microscope disclosed in Korean Patent Publication No. 2001-45981.
Figure 1B:
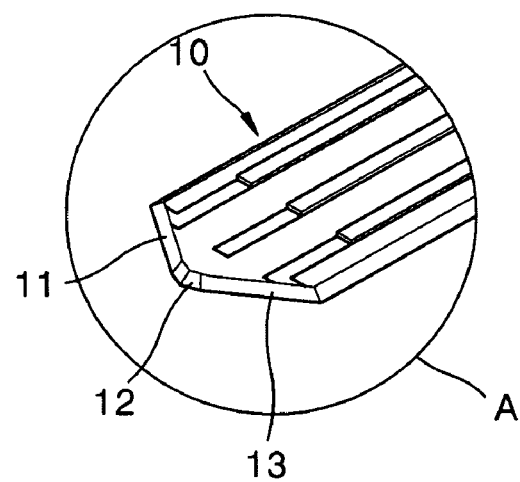
FIG. 1B is an enlarged view of portion A of FIG. 1A.
Figure 2A:
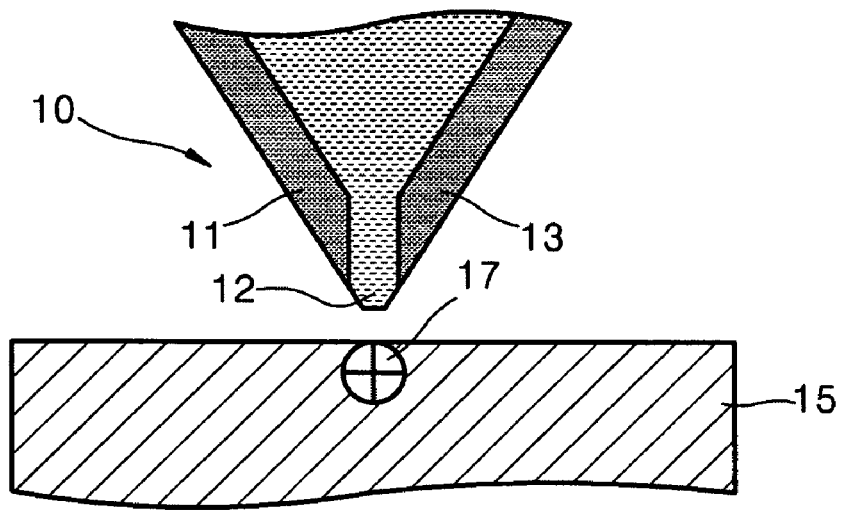
FIG. 2A is a schematic cross-sectional view for explaining a method of detecting a surface charge of a recording medium, using a MOSFET tip.
Figure 2B:
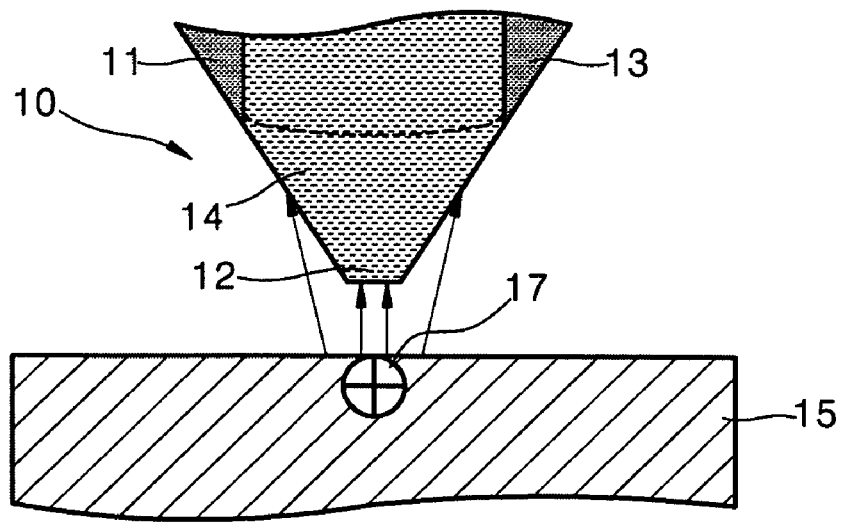
FIG. 2B is a schematic cross-sectional view for explaining a principle of expanding a depletion area in the MOSFET tip.

In the MOSFET tip 10 shown in FIG. 2B, the depletion area 14 expands up to the first and second semiconductor electrode areas 11 and 13 so that a channel containing minority carriers is formed at the peak of the MOSFET tip 10. As a result, a current flows between the source and drain areas 11 and 13, and the polarity of the surface charge 17 can be detected from the strength of the current. However, in the resistive tip 50 according to the present invention shown in FIG. 4, although a depletion area 68 does not expand up to the first and second electrode areas 52 and 54, the resistance of a resistive area 56 varies. Thus, the polarity and amount of a surface charge 57 can be detected from the variation in resistance. Since the semiconductor probe according to the present invention includes the resistive tip 50 having a lower threshold electric field value than the MOSFET tip 10, the sensitivity of the resistive tip 50 is better than the MOSFET tip 10.

As can be seen in FIG. 4, the depletion area 68 formed in the resistive area 56 expands toward the first and second semiconductor electrode areas 52 and 54 due to electric fields induced by the surface charge 57.

Since the resistance R of the resistive area 56 satisfies equation 1, the resistance R is inversely proportional to the area [A] of the resistive area 56. Thus, the resistance R of the resistive area 56 increases with an increase in the area of the depletion area 68. Varying the resistance R varies a current flowing through the resistive tip 50, and thus the surface charge 57 in the recording medium 53 can be detected from variations in the current.

$$R = \rho \frac{l}{A} \quad (1)$$

wherein "ρ" denotes resistivity of the resistive area 56, "l" denotes a gap between first and second semiconductor electrodes in meters, and "A" denotes the area of the resistive area 56 in square meters.

FIGS. 5A through 5I are cross-sectional views for explaining a method of fabricating a semiconductor probe according to the present invention. Here, the method includes steps of forming a resistive area, forming semiconductor electrode areas, forming a mask layer in a square shape, and forming a semiconductor probe.

Figure 5A:
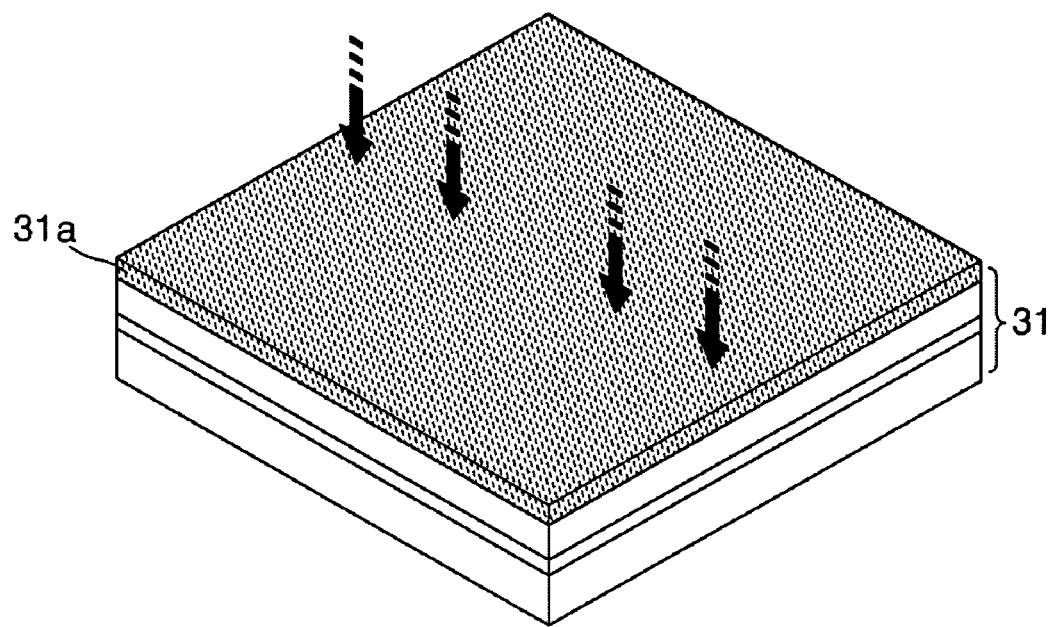
FIGS. 5A through 5I are perspective views for explaining processes of a method of manufacturing the semiconductor probe according to the present invention.

In order to form a resistive area 31a, as shown in FIG. 5A, the surface of a silicon or silicon-on-insulator (SOI) substrate 31, which has been doped with first impurities, is lightly doped with second impurities.

Figure 5B:
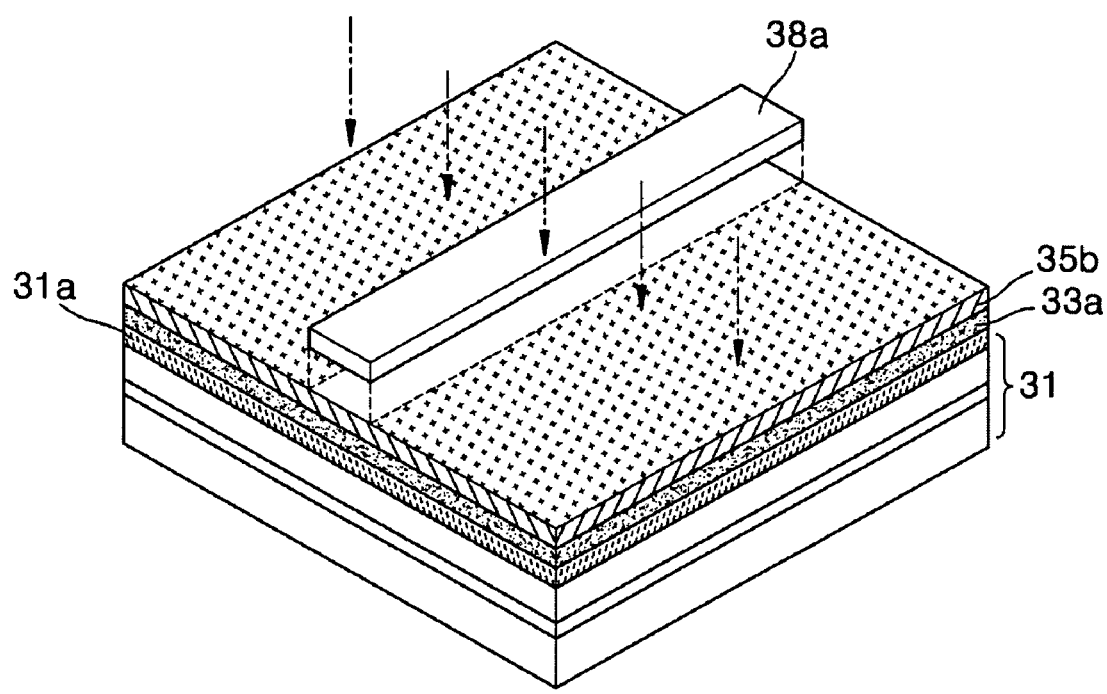

In order to form first and second semiconductor electrode areas 32 and 34, as shown in FIG. 5B, a mask layer 33a is formed of silicon oxide or silicon nitride on the resistive area 31a of the silicon substrate 31. Next, the surface of the mask layer 33a is coated with a photoresist 35b, and a mask 38a having a strip shape is disposed on the photoresist 35b. Thereafter, the resultant structure is exposed, developed, and etched.

Figure 5C:
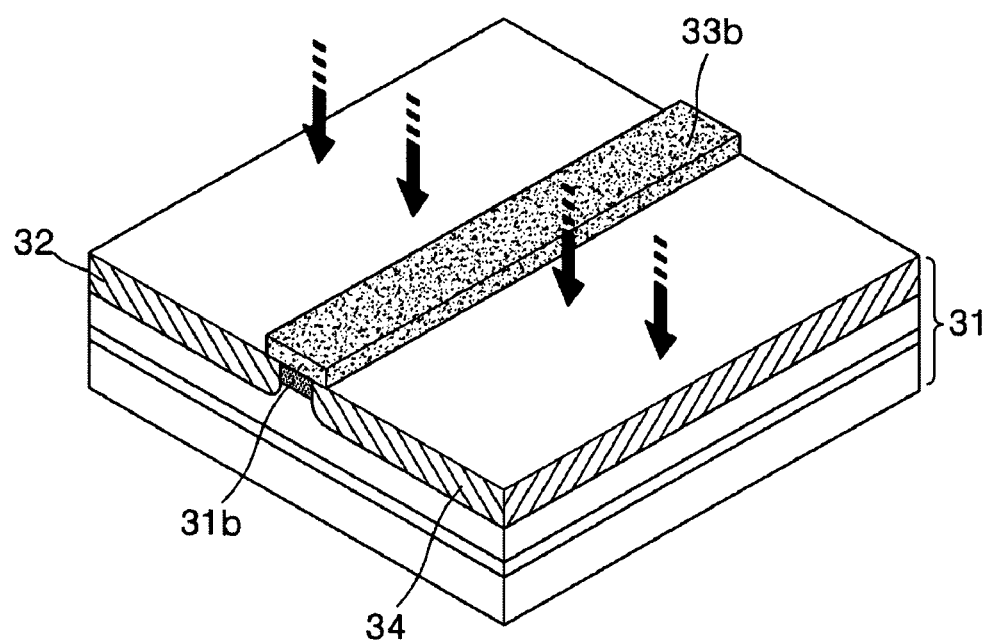

Accordingly, as shown in FIG. 5C, a mask layer 33b having a strip shape is formed on the silicon substrate 31. Next, all areas except the mask layer 33b are heavily doped with second impurities during an ion implantation process to form the first and second semiconductor electrode areas 32 and 34.

During the ion implantation process, the first and second semiconductor electrode areas 32 and 34 may be formed so that they have a much lower resistivity than a resistive area 31b.

In order to reduce the width of the resistive area 31b between the first and second semiconductor electrode areas 32 and 34 to be less than the width of the mask layer 33b, an additional annealing process is performed after the ion implantation process so as to expand a heavily doped region by diffusing ions therein.

In the method of fabricating the semiconductor probe according to the present invention, before fabricating a resistive tip 30, an ion implantation process and a fine photolithographic etching process can be performed to form the first and second semiconductor electrode areas 32 and 34 and reduce the width of the resistive area 31b.

Figure 5D:
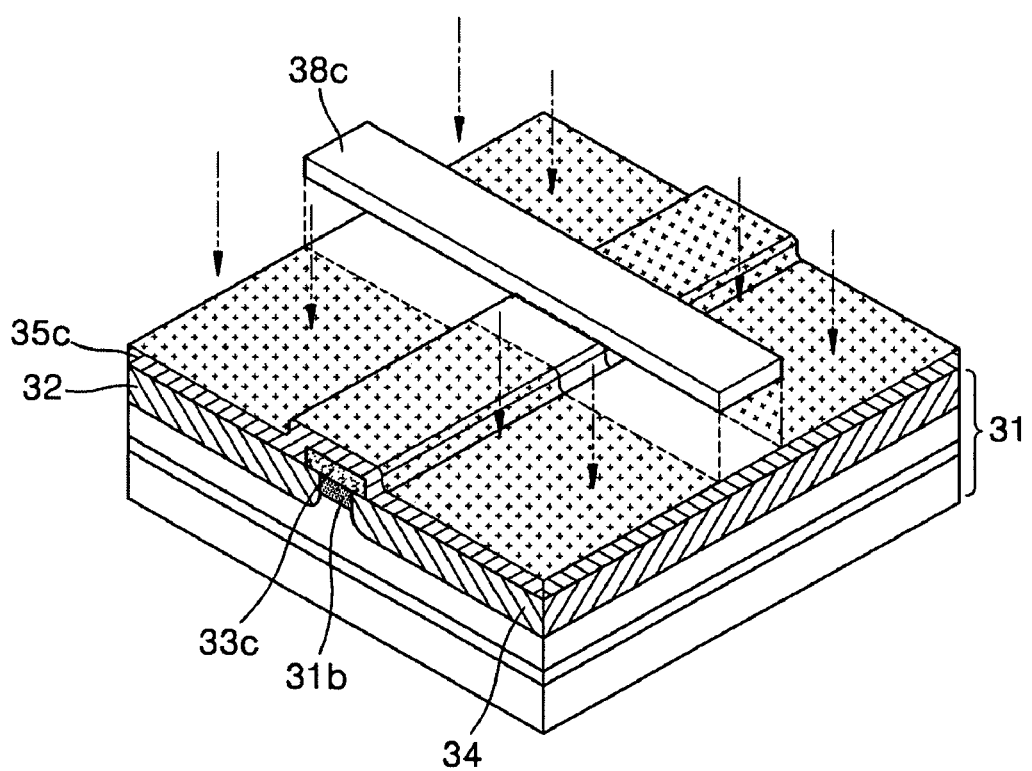
Figure 5E:
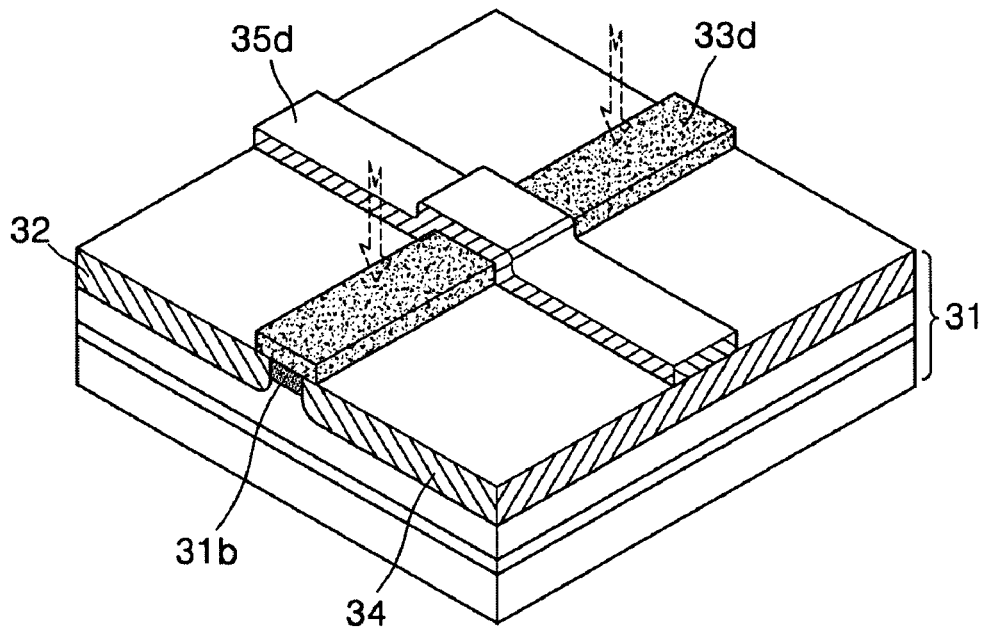

As shown in FIGS. 5D and 5E, a photolithographic process and a dry etching process are performed to form a mask layer 33c having a square shape.

As shown in FIG. 5D, the photolithographic process is first performed. The surface of the silicon substrate 31 is coated with a photoresist 35c so as to cover the mask layer 33c. Next, a photo mask 38c having a strip shape is disposed on the photoresist 35c so as to be perpendicular to the mask layer 33c. Thereafter, the resultant structure is exposed, developed, and etched to form a photoresist layer 35d having the same shape as the photo mask 38c.

Figure 5F:
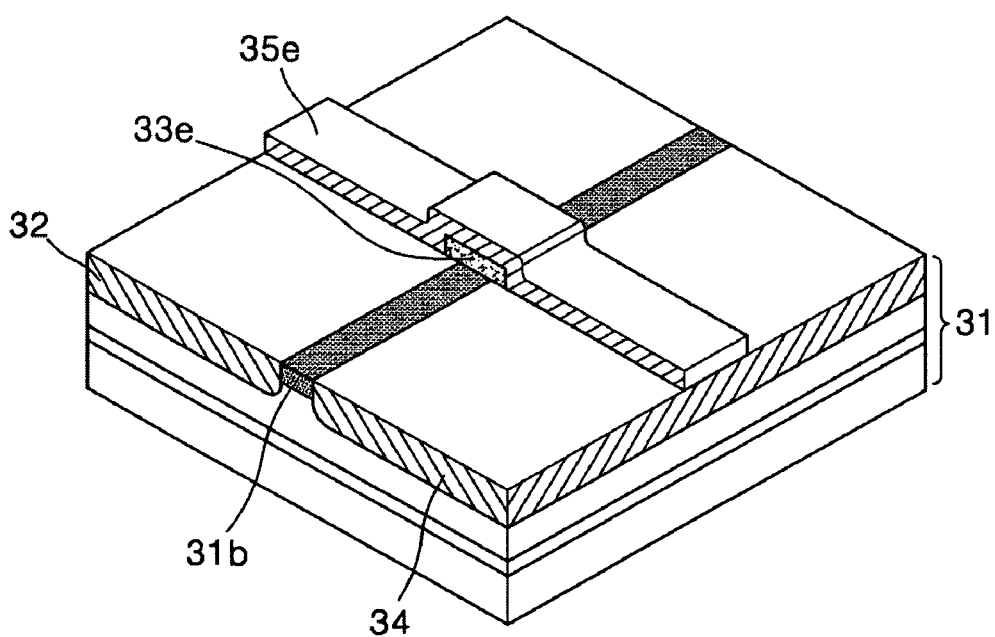

As shown in FIG. 5E, a portion of the mask layer 33d not covered with the photoresist layer 35d is dry etched so that the mask layer 33d is made into a mask layer 33e having a square shape as shown in FIG. 5F.

Figure 5G:
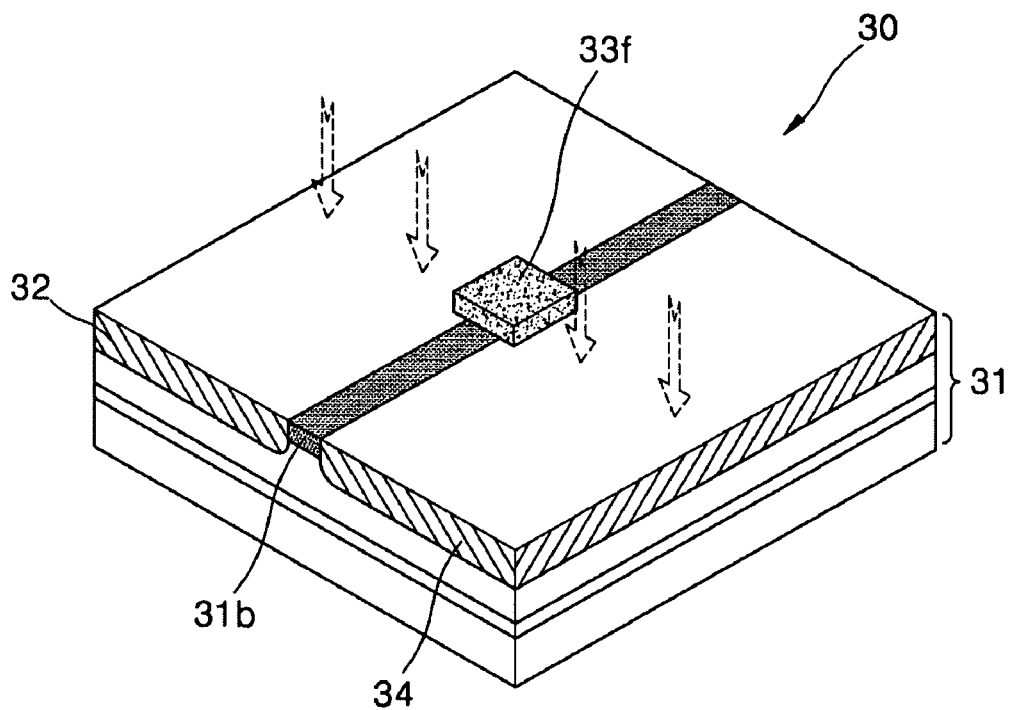
Figure 5H:
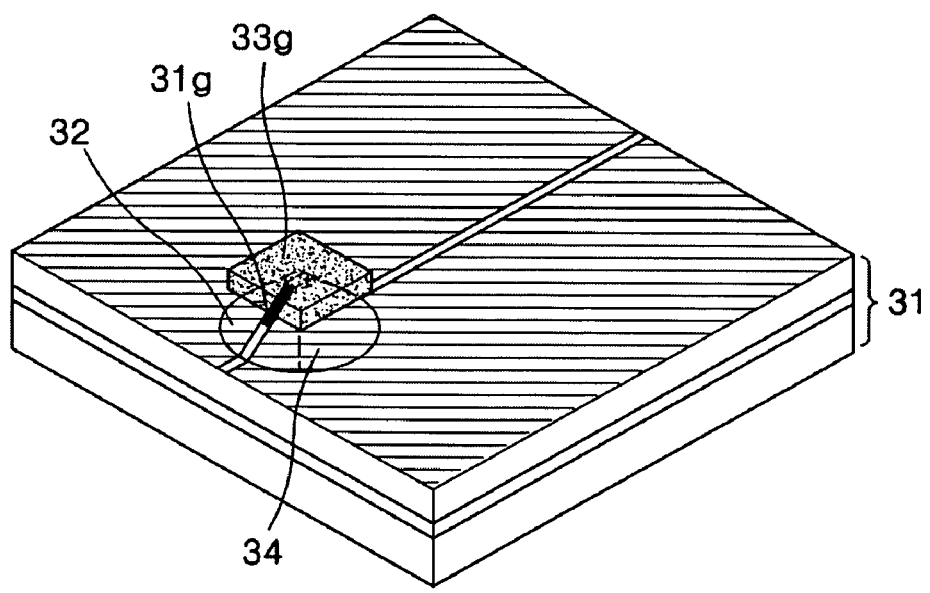

As shown in FIG. 5G, the silicon substrate 31 is wet or dry etched using a mask layer 33f having a square shape as a mask. Thereafter, as shown in FIG. 5H, the first and second semiconductor electrode areas 32 and 34 are placed on the slope of the resistive tip 30, and then a resistive area 31g is aligned at the peak of the resistive tip 30.

Figure 5I:
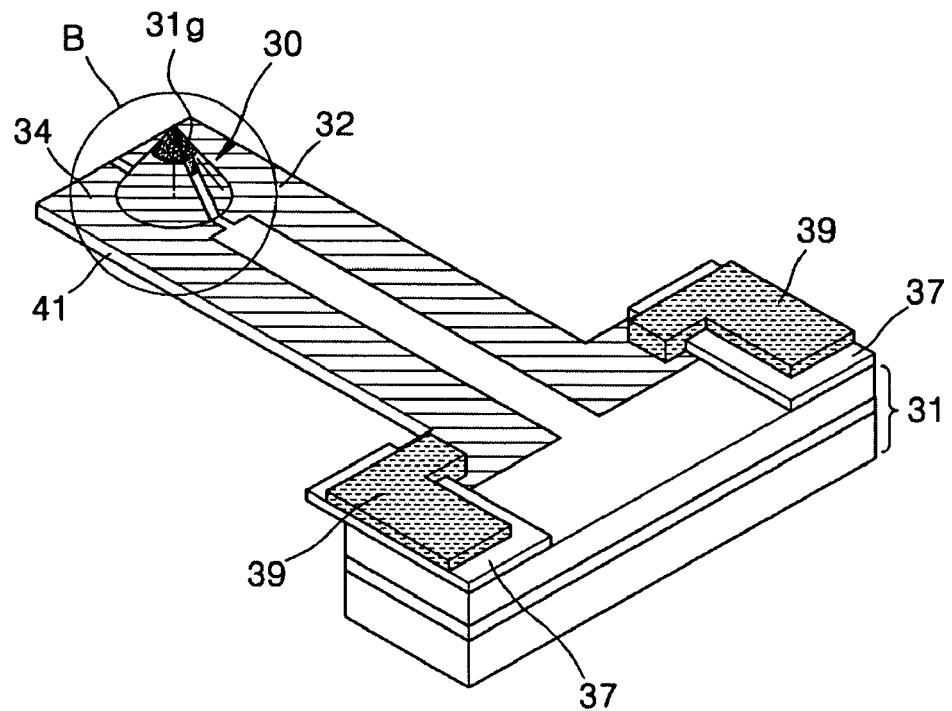

FIG. 5I illustrates a semiconductor probe completed using the above-described overall process. Referring to FIG. 5I, insulating layers 37 are stacked on the silicon substrate 31. Electrodes 39 are formed on the insulating layers 37. A cantilever 41 extends from the silicon substrate 31. The resistive tip 30 is perpendicularly formed on the cantilever 41. The first and second semiconductor electrode areas 32 and 34 heavily doped with second impurities are positioned on the slop of the resistive tip 30. The resistive area 31g lightly doped with second impurities is positioned at the peak of the resistive tip 30. The first and second semiconductor electrode areas 32 and 34 are connected to the electrodes 39 via the cantilever 41.

Figure 6:
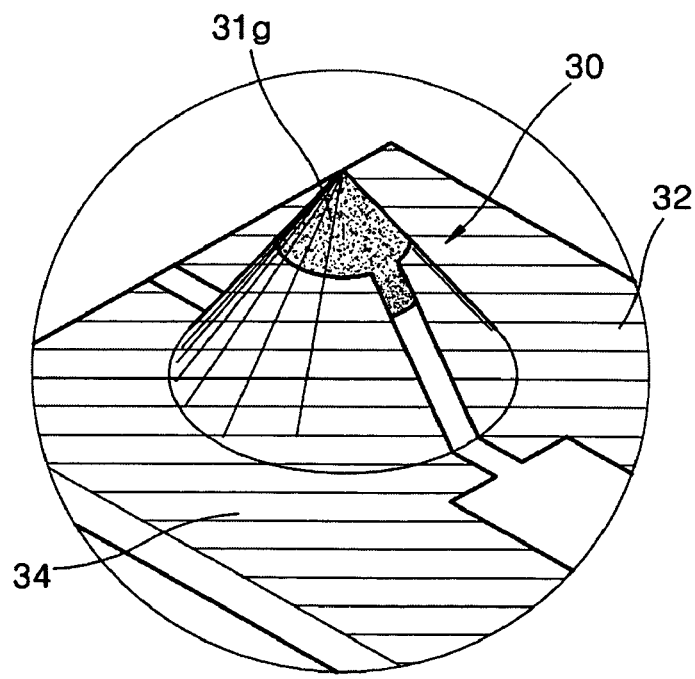
FIG. 6 is an enlarged view of portion B of FIG. 5I.

FIG. 6 is an enlarged view of portion B of FIG. 5I for illustrating the resistive tip 30 of the semiconductor probe according to the present invention. Referring to FIG. 6, the resistive area 31g is positioned at the peak of the resistive tip 30 that is conical. The first and second semiconductor electrode areas 32 and 34 are spaced apart from each other and contact the resistive area 31g. The first and second semiconductor electrode areas 32 and 34 are disposed on right and left sides of the resistive tip 30 and extend the whole surface of the cantilever 41.

Figure 7:
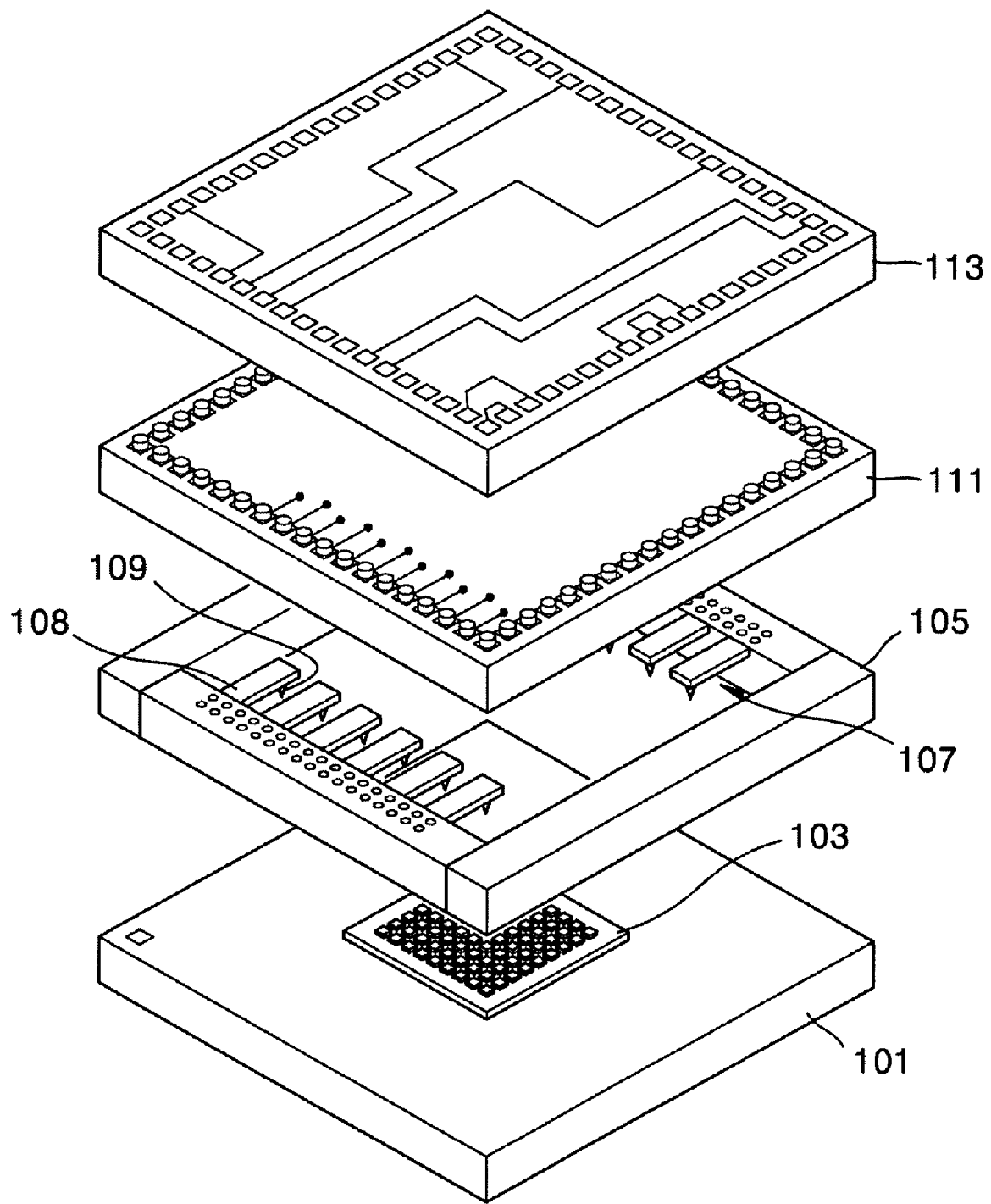
FIG. 7 is an exploded perspective view of an information recording apparatus having the semiconductor probe according to the present invention.

FIG. 7 is an exploded perspective view of an information recording and/reproducing apparatus using the semiconductor probe shown in FIG. 5 according to the present invention. Referring to FIG. 7, a stage 101 on which a recording medium 103 is placed is positioned at the bottom. A semiconductor probe array 105 in which a plurality of semiconductor probes 107 are aligned is disposed over the recording medium 103. A first signal processing module 113 and a second signal processing module 111 are aligned on the semiconductor probe array 105. The first signal processing module 113 converts external information into a signal that can be recorded by the plurality of semiconductor probes 107 or converts a signal reproduced by the plurality of semiconductor probes 107 into information to be transmitted to the outside. The second signal processing module 111 transmits the signal converted by the first signal process module 113 to the semiconductor probe array 105 or transmits a signal generated by the semiconductor probe array 105 to the first signal processing module 113.

The stage 101 drives the recording medium 103 to move the recording medium 103 toward a desired probe among the plurality of semiconductor probes 107.

An information measuring apparatus using the semiconductor probe according to the present invention may be constituted. The information measuring apparatus includes a semiconductor probe. The semiconductor probe includes a tip and a cantilever. The tip doped with first impurities has a resistive area that is doped with second impurities and formed at the peak of the tip, and first and second semiconductor electrode areas, which are doped with the second impurities and contact the resistive area where the second impurities are different from the first impurities. The tip is positioned at an end portion of the cantilever. The semiconductor probe measures information by detecting a variation in the resistance of the resistive area due to electric fields induced by a sample. The principle of measuring information using the information measuring apparatus is similar to principle of reproducing information using the information recording and/or reproducing apparatus according to the present invention.

Figure 8A:
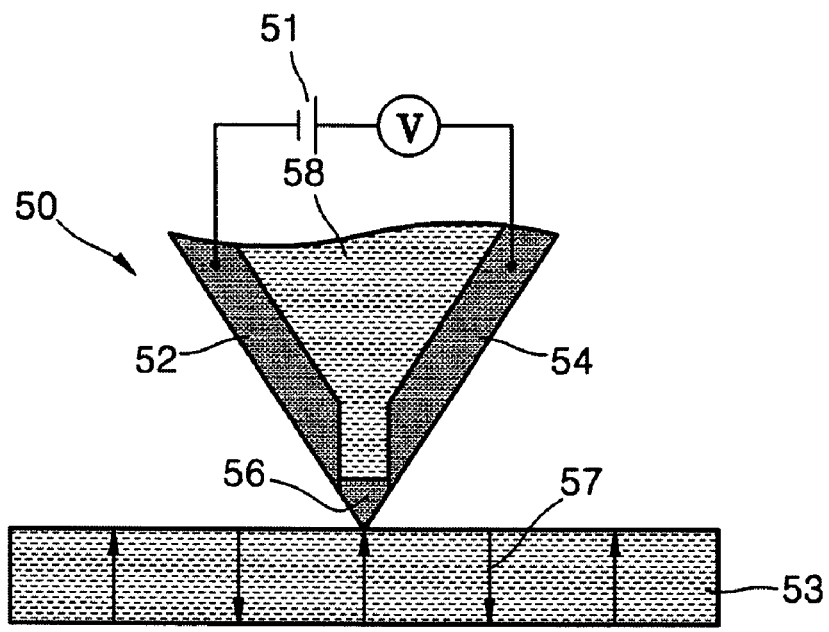
FIGS. 8A and 8B are schematic cross-sectional views for explaining a method of reproducing information using the semiconductor probe according to the present invention.
Figure 8B:
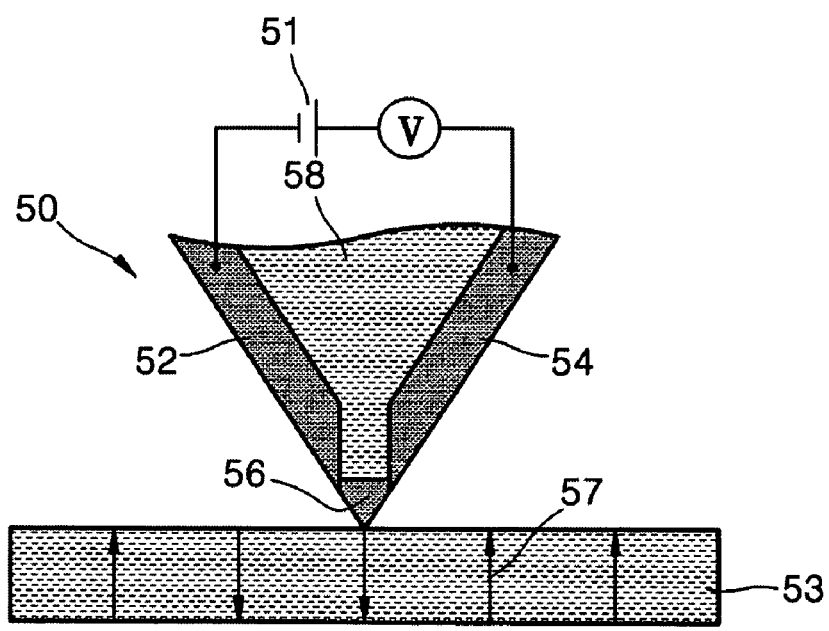

Hereinafter, a method of recording and reproducing information using the information recording and/or reproducing apparatus according to an embodiment of the present invention will be described in detail with reference to FIGS. 8A, 8B, and FIG. 8A illustrates a method of reproducing information by detecting a positive surface charge using a semiconductor probe in which a resistive area is formed by doping p-type impurities therein. FIG. 8B illustrates a method of reproducing information by detecting a negative surface charge using a semiconductor probe in which a resistive area is formed by doping n-type impurities therein.

Referring to FIG. 8A, first and second semiconductor electrode areas 52 and 54 are heavily doped with p-type impurities, and a resistive area 56 is lightly doped with p-type impurities. A portion of a recording medium 53 over which a resistive tip 50 is positioned has a positive surface charge 57. As a result, a depletion area (not shown) is formed in the resistive area 56 by electric fields induced by the positive surface charge 57.

As the depletion area is a nonconductive area, the area of the resistive area 56 is reduced, which increases resistance. The resistive tip 50 can detect the positive surface charge 57 from a variation in the resistance. If the resistive tip 50 is positioned over a negative surface charge, a depletion area is not formed. As a result, the resistance hardly varies or is reduced, and thus the polarity of a surface charge can be detected from the change in the resistance. A negative charge may be defined as information "0", and a positive charge may be defined as information "1". The opposite case is also possible.

Referring to FIG. 8B, first and second semiconductor electrode areas 52 and 54 are heavily doped with n-type impurities, and a resistive area 56 is lightly doped with n-type impurities. A portion of a recording medium 53 over which a resistive tip 50 is positioned has a negative surface charge 57. A depletion area (not shown) is formed in the resistive area 56 by electric fields induced by the negative surface charge 57. A principle of detecting the negative surface charge from a variation in resistance due to a reduction in the area of the resistive area 56, using the resistive tip 50 according to the present invention, is the same as that described with reference to FIG. 6A.

If the surface charge 57 is positive, a depletion area does not expand, and resistance hardly varies or is reduced. Thus, the polarity of the surface charge 57 can be detected from the change in the resistance.

Figure 9:
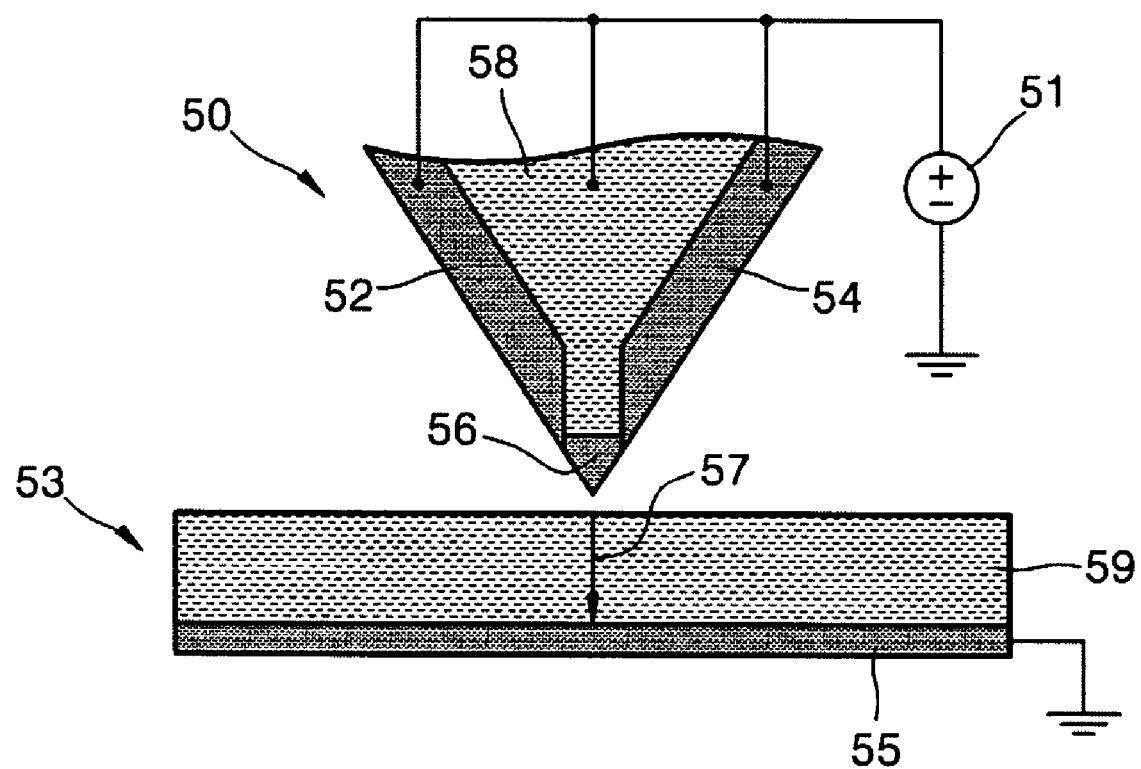
FIG. 9 is a schematic cross-sectional view for explaining a method of recording information using the semiconductor probe according to the present invention.

FIG. 9 is a cross-sectional view for illustrating a method of recording information on a recording medium 53 using the semiconductor probe according to the present invention. Referring to FIG. 9, in order to record information on the recording medium 53, the same voltage is applied to first and second semiconductor electrode areas 52 and 54 and to a body 58 of a resistive tip 50. A bottom electrode 55, which supports the recording medium 53, is grounded. As a result, electric fields are formed between the peak of the resistive tip 50 and the bottom electrode 55 of the recording medium 53. Here, even if the same voltage is applied only to the first and second semiconductor electrode areas 52 and 54, electric fields are formed between the resistive tip 50 and the bottom electrode 55, thereby allowing information to be recorded on the recording medium 53.

By the electric fields a dielectric polarization of a ferroelectric layer in the recording medium 53 is created. Thus, a surface charge 57 can be created or the polarity of an existing surface charge can be changed. A negative charge may be defined as information "0", and a positive charge may be defined as information "1". The opposite case is also possible.

Figure 10:
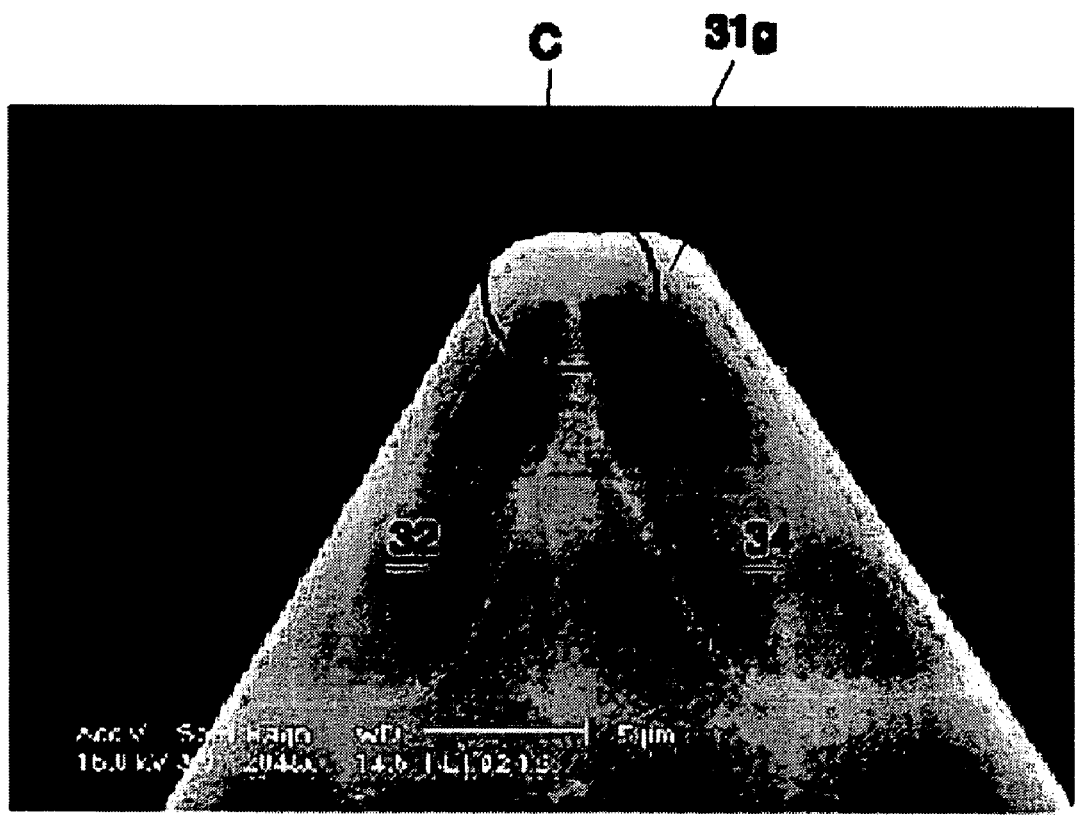
FIG. 10 is a photo of a scanning electron microscope (SEM) of a resistive tip of the semiconductor probe according to the present invention.

FIG. 10 is a photo of an SEM of a resistive tip of the semiconductor probe, according to the present invention, which is perpendicular to the end portion of a cantilever. Here, reference character C denotes a portion of the cantilever in which a resistive area 31g is positioned, and reference numerals 32 and 34 denote first and second semiconductor electrode areas, respectively.

Figure 11:
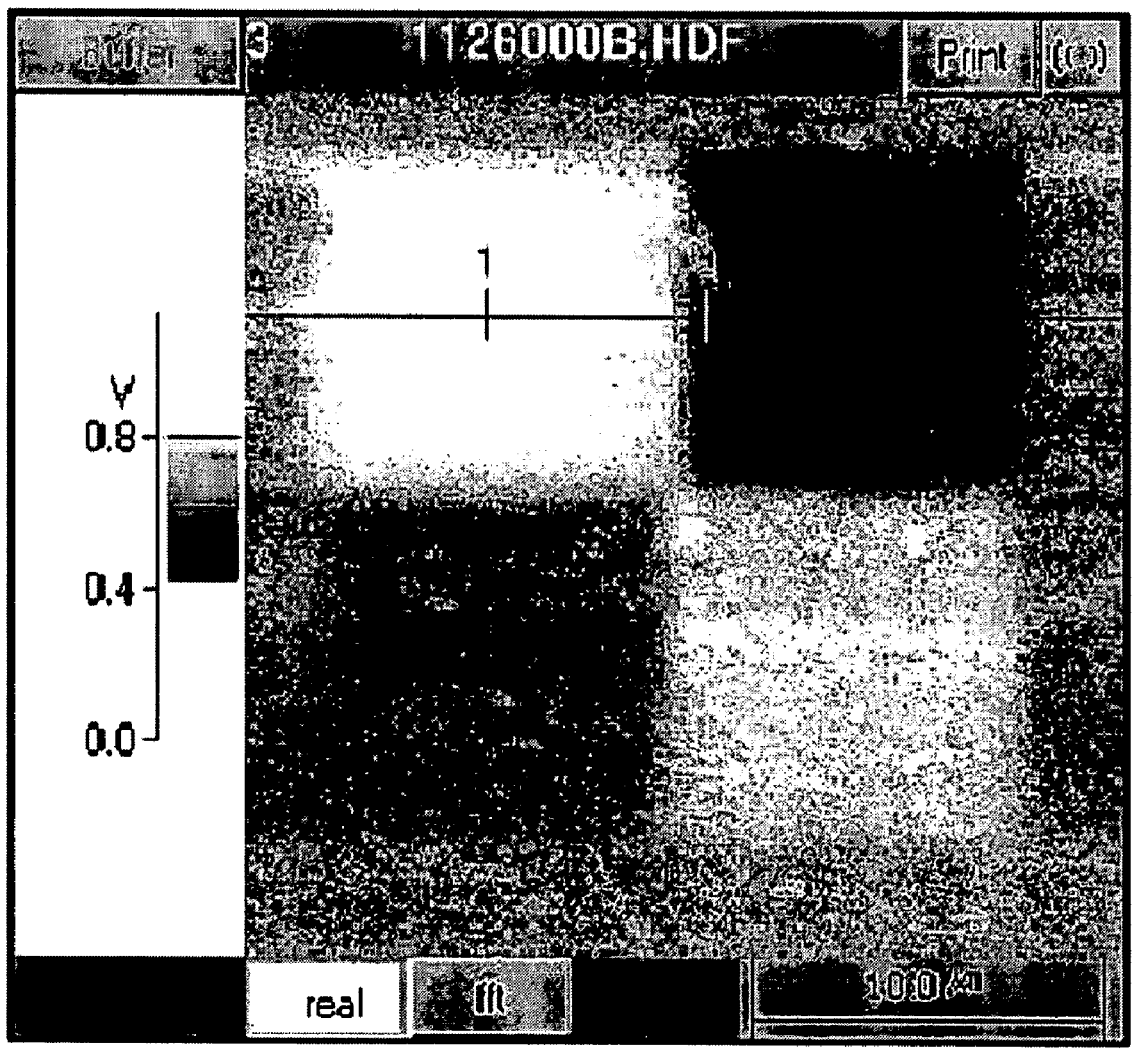
FIG. 11 illustrates a ferroelectric polarization of a lead zirconium titanate, $Pb(Zr_xTi_{1-x})O3$ (PZT) layer detected by the semiconductor probe according to the present invention.
Figure 12:
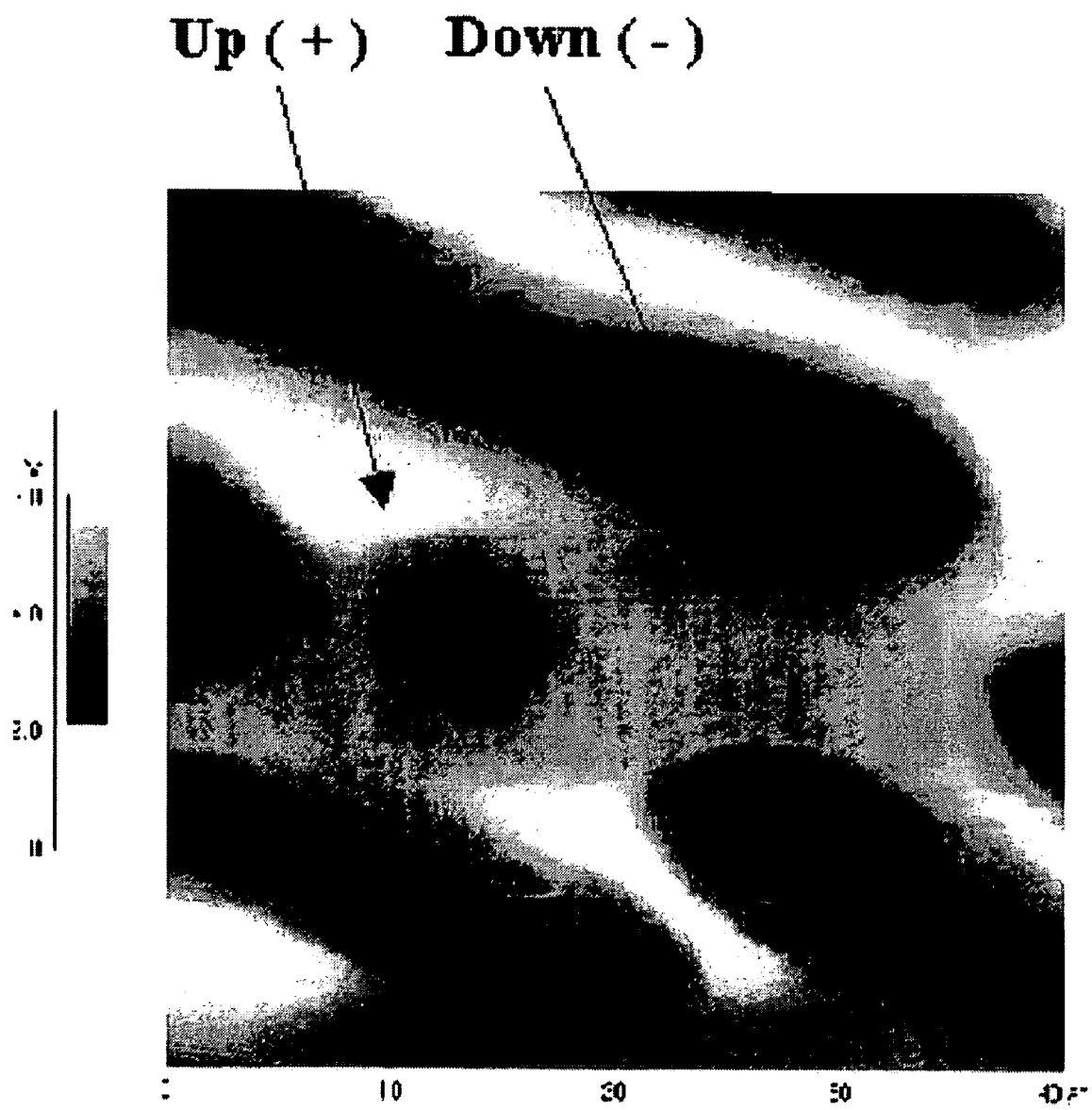
FIG. 12 illustrates a ferroelectric polarization of a triglycine sulfate (TGS) layer detected by the semiconductor probe according to the present invention.

FIG. 11 is an image illustrating ferroelectric polarization information recorded on a PZT layer using the semiconductor probe according to the present invention, as a variation in a resistance of the semiconductor probe. FIG. 12 is an image illustrating a ferroelectric polarization of a triglycine sulfate (TGS) layer. In an experiment carried out to obtain the images, a recording voltage was set to 15V, a reproducing voltage was set to 4V, and the scan rate was set to 2 Hz. In FIGS. 11 and 12, a white portion represents the positive charges from domain polarized in bottom-to-top direction, and a black portion represents the negative charges from domain polarized in top-to-bottom direction. An information measuring apparatus using a semiconductor probe according to an aspect of the present invention detects and images electric fields induced by charges contained in a sample by using the above-described principle.

As is known, the surface charge density of the ferroelectric polarization of the TGS layer is generally about several $\mu C/cm^2$, and the surface charge density of the ferroelectric polarization of the PZT layer is about several tens of $\mu C/cm^2$.

By using a semiconductor probe according to the present invention, information having a small charge density of about several $\mu C/cm^2$ can be recorded or reproduced. Also, unlike an existing EFM, the semiconductor probe according to the present invention does not use a signal modulation technique. Thus, the semiconductor probe can detect a signal at a high speed.

A method of fabricating a semiconductor probe according to the present invention can form a resistive area in a resistive tip perpendicular to the end portion of a cantilever using a self-alignment method of forming a resistive area in the center of a resistive tip that is positioned between semiconductor electrode areas. As a result, SPM-based nano-devices for detecting a small amount of surface charge in a small area of a recording medium can be easily fabricated.

When a nano-information recording, reproducing, or measuring apparatus having a large capacity adopts the semiconductor probe that is suggested in the present invention, the nano-information recording, reproducing, or measuring apparatus can detect a charge in a small area of a recording medium to record and reproduce information.

While the present invention has been particularly shown and described with reference to exemplary embodiments thereof, it will be understood by those of ordinary skill in the art that an apparatus can record and reproduce information using various types of semiconductor probes without departing from the spirit and scope of the present invention as defined by the following claims. Therefore, the scope of the present invention must be defined by the appended claims not by the above embodiments.

As described above, in a semiconductor probe and a method of manufacturing the same according to the present invention, a resistive area can be formed in a resistive tip perpendicular to a cantilever to detect a small surface charge. The semiconductor probe has good sensitivity and can be used in a nano-sensor or the like.

Also, since information can be detected from a variation in the resistance of the resistive area, information can be recorded and reproduced at a high density using a small driving voltage.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A probe comprising:
   a tip doped with first impurities; and
   a cantilever having an end portion on which the tip is positioned,
   wherein the tip comprises:
   a resistive area positioned at the peak of the tip and lightly doped with second impurities that are different from the first impurities; and
   first and second semiconductor electrode areas heavily doped with the second impurities and contacting the resistive area.

2. An information recording apparatus for recording information on a recording medium, the information recording medium comprising a bottom electrode, a ferroelectric layer stacked on the bottom electrode, and a semiconductor probe comprising:
   a tip that is doped with first impurities in all part excluding a resistive area doped with second impurities at the peak of the tip and semiconductor electrode areas doped with second impurities at the slope of the tip; and
   a cantilever having the tip positioned in an end portion of the cantilever,
   wherein information is recorded in the form of dielectric polarization in the recording medium by applying a voltage between the semiconductor electrodes and the bottom electrode thereby switching dielectric polarization in the ferroelectric layer.

3. An information reproducing apparatus for reproducing information from a recording medium, the information reproducing apparatus comprising a ferroelectric layer and a semiconductor probe comprising:
   a tip that is doped with first impurities in all part excluding a resistive area doped with second impurities at the peak of the tip and semiconductor electrode areas doped with second impurities at the slope of the tip; and
   a cantilever having the tip positioned in an end portion of the cantilever,
   wherein the semiconductor probe reproduces information recorded on the recording medium by detecting a variation in the resistance of the resistive area due to electric fields induced by the recording medium.

4. An information measuring apparatus comprising a semiconductor probe comprising:
   a tip that is doped with first impurities in all part excluding a resistive area doped with second impurities at the peak of the tip and semiconductor electrode areas doped with second impurities at the slope of the tip; and
   a cantilever having the tip positioned in an end portion of the cantilever,
   wherein the semiconductor probe measures information by detecting a variation in the resistance of the resistive area due to the electric fields induced by the sample.

5. A probe comprising:
   a tip that is doped with first impurities in all parts excluding a resistive area doped with second impurities at the peak of the tip and semiconductor electrode areas doped with second impurities at the slope of the tip; and
   a cantilever having the tip positioned in an end portion of the cantilever.

6. The probe of claim 1, wherein the probe includes at least some semiconductor material.

7. The probe of claim 5, wherein the probe includes at least some semiconductor material.

8. The probe of claim 5, wherein the semiconductor electrodes are doped with the second impurities more heavily than the resistive area is doped with the second impurities.

* * * * *